United States Patent [19]

Hirosawa et al.

[11] Patent Number: 4,646,235
[45] Date of Patent: Feb. 24, 1987

[54] COMPUTER NETWORK HAVING A HOST-LOCAL FILE I/O OPERATION

[75] Inventors: Toshio Hirosawa, Machida; Masaru Ohki, Kodaira; Shigeru Motobayashi, Chofu; Yutaka Kuwahara, Hachioji, all of Japan

[73] Assignee: Hitachi, Ltd., Tokyo, Japan

[21] Appl. No.: 515,193

[22] Filed: Jul. 19, 1983

[30] Foreign Application Priority Data

Jul. 20, 1982 [JP] Japan .................. 57-126341

[51] Int. Cl.$^4$ .................................... B06F 13/14
[52] U.S. Cl. ........................................... 364/200
[58] Field of Search ... 364/200 MS File, 900 MS File, 364/300; 340/798, 799, 825.06, 825.15

[56] References Cited

U.S. PATENT DOCUMENTS

| 4,091,448 | 5/1978 | Clausing | 364/200 |
| 4,274,139 | 6/1981 | Hodgkinson | 364/200 |
| 4,417,304 | 11/1983 | Dinwiddie | 364/200 |
| 4,437,184 | 3/1984 | Cork | 364/200 |
| 4,500,960 | 2/1985 | Babecki | 364/200 |
| 4,509,122 | 4/1985 | Agnew | 364/200 |

Primary Examiner—James D. Thomas
Assistant Examiner—Florin Munteanu
Attorney, Agent, or Firm—Antonelli, Terry & Wands

[57] ABSTRACT

A computer system network with host machines and local machines linked hierachically with each other, wherein if file I/O status flag in control table of a local machine is set to terminal operation replacement mode by command input by terminal user, a data I/O request issued by an application program in a host machine to a terminal connected to the local machine is implemented by the I/O operation on the file connected to the local machine in place of the I/O operation on the terminal.

26 Claims, 11 Drawing Figures

| ITEM | SYMBOL | NAME | CONTROL CHARACTER COMBINATION | | | | PROCESS | POINTER INCREMENT (BYTES) |
|---|---|---|---|---|---|---|---|---|
| | | | 1ST CHAR. | 2ND CHAR. | 3RD CHAR. | 4TH CHAR. | | |
| 1 | SBA | SET BUFFER ADDRESS | SBA X"11" | ADR-I | ADR-II | | IF NEXT LINE, STORE RECORD IN FILE. | +3 |
| 2 | F H | FIELD HEADING | F H X"1D" | DFC-I | DFC-II | DFC-III | INCREMENT SCANNING POINTER IN DATA STREAM | +3 OR +4 |
| 3 | I C | INSERT CURSOR | I C X"13" | | | | SAVE CURRENT BUFFER ADDRESS IN FCB | +1 |
| 4 | O R | ON-LINE REPEAT | O R X"3C" | ADR-I | ADR-II | | REPEAT THE CHARACTER INDICATED BY 4TH CHAR. UNTIL THE POINT IMMEDIATELY BEFORE THE BUFFER ADDRESS INDICATED BY ADR-I, II. | +4 |
| 5 | O T | ON-LINE TAB | O T X"05" | | | | INCREMENT SCANNING POINTER IN DATA STREAM. | +1 |
| 6 | GRF | GRAPHIC CODE | X"1A" | X"4E" | X"40" | COUNT | OBTAIN TOTAL NUMBER OF BYTES OF GRAPHIC INFORMATION (EXPRESSED IN 4TH AND 5TH CHARACTER), AND WRITE GRAPHIC PROCESS DATA IN FILE. | +5 |

FIG. 10

COMPUTER NETWORK HAVING A HOST-LOCAL FILE I/O OPERATION

BACKGROUND OF THE INVENTION

The present invention relates to a data processing system and, particularly to a data processing system wherein when a host machine makes access to an I/O unit of a local machine, the local machine replaces that input/output operation with the input/output operation of another I/O unit.

In recent years, it is a common practice to organize a computer network system in which a plurality of computer systems are linked with each other. For example, there is known a laboratory automation (LA) control system in which host machines (large computers) and local machines (small computers) are linked together hierarchically. The purposes for organizing a computer system network are to carry out: (1) effective utilization of communication resources, (2) distribution of functions of the communication system, (3) flexible expansion of the communication network, and (4) labor saving in the application system.

As a method of accessing another machine through the communication line, there is known the Virtual Telecommunication Access Method (VTAM), that provides as advantages: (1) a plurality of application programs can be used at one terminal, (2) a plurality of terminals can share one communication line, (3) the application program within a host machine can be used at any location in the network, and (4) the application program need not be aware of the network organization. The computer system network organization and VTAM are described in IBM Systems Journal, Vol. 15, No. 1, 1976; in an article entitled "Synchronous data link control: A perspective", IBM Systems Journal, Vol. 13, No. 2, 1974; and in "VOS3 ECS/VTAM Guide", (manual of Hitachi, Ltd.) 8080-3-140, 1980.

Figure 1:
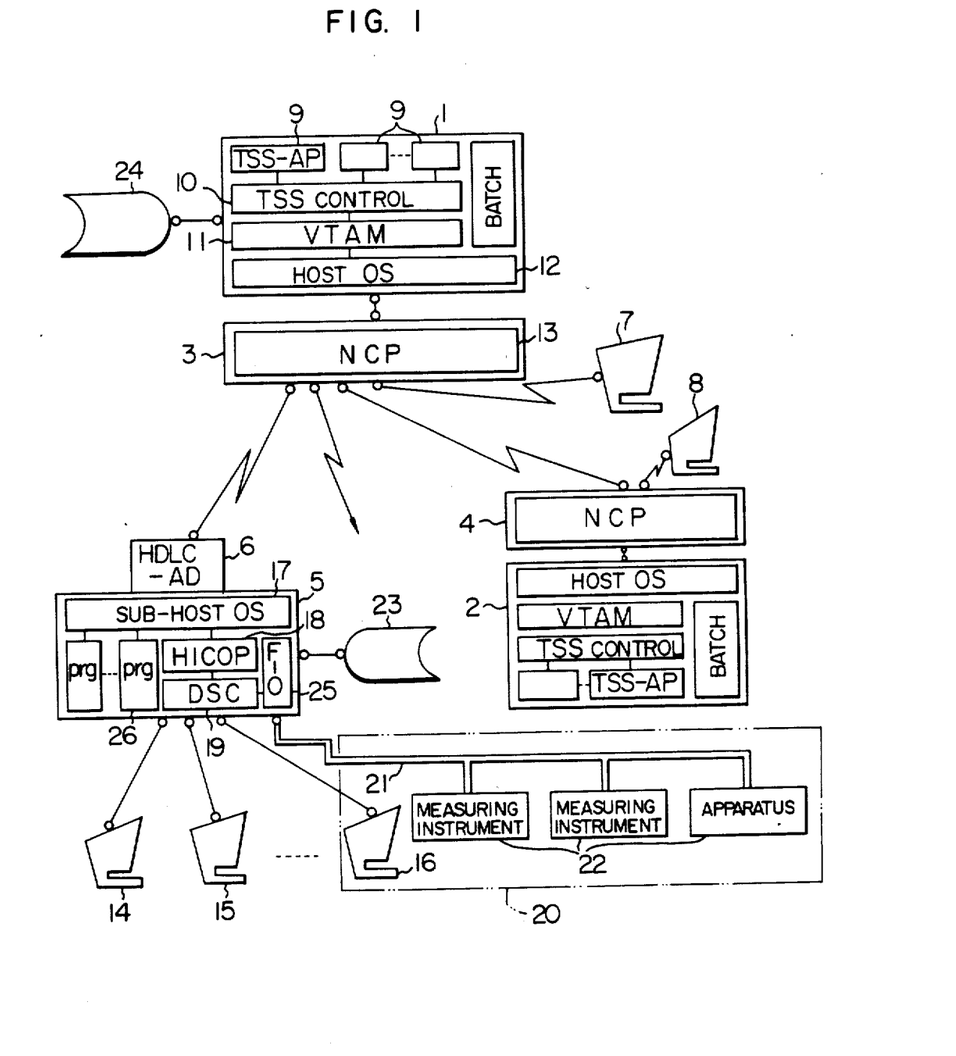
FIG. 1 is a diagram showing one example of the computer system network organization according to the present invention.

Referring to FIG. 1 showing an example of the inventive system network organization, the prior art system network will first be explained. In FIG. 1, host machines 1 and 2 are linked with each other via communication control computers 3 and 4, respectively, through the communication line. The communication control computers 3 and 4 can be connected in parallel with other machines within the network. A local machine (subsidiary host machine) 5 is linked via a control unit 6 with the communication control computer 3 of the host machine 1 or with other local machines so that they communicate with each other. The control unit 6 controls the communication procedure such as the High-level Data Link Control (HDLC) procedure and Synchronous Data Link Control (SDLC) procedure.

In the conventional system network organization, the application program of the host machine 1 can be used by a data terminal, i.e. I/O unit, 8 of the host machine 2, as well as by a data terminal 7 of the host machine 1. Assuming the application program to be a time sharing system (TSS), the host machine 1 runs a plurality of user programs (TSS-AP) 9 under TSS control program 10, which transacts data with its data terminal 7 and the data terminal 8 of the host machine 2 by using VTAM program 11.

Namely, when a user program 9 outputs a message to the data terminal 7 or 8, it is sent to the terminal 7 or via the communication control computer 4 to the terminal 8 after the HDLC procedure has been processed by Network Control Program (NCP) 13 within the communication control computer 3 following VTAM 11 and operating system (Host OS) 12. Conversely, it is possible for the terminals 7 and 8 to enter messages into the host machine 1 by the reverse process for the above procedure.

It is also possible for terminals 14, 15 and 16 connected to the local machine 5 to use the application program of the host machine 1 or 2. Such local machine 5 is called a local machine with cluster control function.

In the local machine 5, program HICOP (Hitachi Network Architecture Subhost Communication Program) 18 is run under operating system 17, and further, program DSC (Data Stream Compatibility) 19 is run. The HICOP 18 is a program for performing functions equivalent to those of VTAM of the host machine, and the DSC 19 is a program which performs so that the application program 9 in the host machine 1 can access the data terminal units 14, 15 and 16 connected to the local machine 5 in the same way as for the terminal 7.

Thus, owing to VTAM and the cluster control function of the local machine 5, the conventional computer system network has been advantageous in (1) using terminals connected to a local machine as terminals of the host machine, and (2) using the capability and resources of the host machine by the terminals of local machines.

Reference numeral 20 denotes an experimental room of Laboratory Automation System (LA) connected hierarchically with the host machine 1 and local machine 5. The room is equiped with a local terminal 16 and measuring instrument standard interface bus 21, so that control data and measurement data of instruments and experimental apparatus 22 are collected by the local machine 5 and the collected measurement data is stored in a local file 23 which is a file storage of the local machine 5.

Subsequently, the host machine 1 is required for more high-grade analysis for the collected measurement data, and on this account the measurement data stored in the local file 23 is transferred to a host file 24 which is a file storage of the host machine 1, and then the host machine 1 reads out the measurement data from the host file 24 and executes analysis program 9 within the host machine 1. Following the analysis, resultant data in the host file 24 must be transferred back to the local file 23 of the local machine 5. For file transfer, it is a common practice to perform a Remote Job Entry (RJE) function in which a batch job request is issued by the local machine 5 to the host machine 1.

Although this method of requesting the host machine 1 for a job by use, of the RJE function takes little time in transferring data between the local file 23 and the host file 24, such file transfer is carried out as a batch job by the host machine 1, causing a considerable time loss to an extent of 5–10 minutes for a small scale job during the wait time for job execution (or the wait time of job scheduling). Namely, although the conventional system network organization allows the terminal 16 of the local machine 5 to use the application programs 9 for the analysis under the TSS control program 10, in actual practice, it takes a considerable time before the analysis program 9 is operable, resulting in an inefficient use of the hierarchical linkage between the host machine 1 and the local machine 5.

SUMMARY OF THE INVENTION

In order to overcome the foregoing prior art problem, it is an object of the present invention to provide a data processing system wherein the application program in the host machine is allowed to make a direct access to files of local machines so as to eliminate file transfer between the local files and host file, thereby enhancing the process efficiency.

Another object of the present invention is to provide a data processing system for a computer system network in which host machines and local machines are linked hierarchically, wherein the data process efficiency can be improved without the need of changing the host machine program and the system organization.

The present invention resides characteristically in a data processing system for a computer system network in which host machines and local machines are linked hierarchically, wherein by entering a specified command through an I/O unit of a local machine in advance, a file I/O status flag of a control table in the local machine is set, and then when the application program running in a host machine issues a data input/output request to the I/O unit connected to the local machine, and if the flag is once set, the input/output operation on the I/O unit directed by the host machine is replaced by the local machine with the input/output operation on another I/O unit connected to the local machine.

DESCRIPTION OF THE PREFERRED EMBODIMENT

In FIG. 1, a local machine 5 incorporates the principal functions of the data processing system, and a newly provided terminal operation replacing program (FIO: File In/Out) 25 creates the input/output operation on a local file 23 equivalent to the operation carried out on a local terminal by the operator of the terminal. As mentioned previously, in the conventional laboratory automation (LA) control system in which the host machine 1 and local machine 5 are linked hierarchically through a network so that measurement data collected by the local machine 5 is analyzed by the host machine 1, the measurement data is once stored in the local file 23, and then data is transferred from the local file 23 to the host file 24 by requesting a batch job (RJE: Remote Job Entry) to the host machine, and thereafter, the data is processed by the application program 9 of the host machine 1.

According to the present invention, a message input/output request issued by the host machine 1 in execution of the analysis program to the data terminal 16 of the local machine 5 operates on the terminal operation replacing program 25 in the local machine 5 to replace that input/output operation with the input/output operation from the host machine 1 to the local file 23. Namely, by presetting the I/O status flag specifying the terminal replacement operation through the entry of a predetermined command by the terminal user, the file name handled by the terminal operation replacing control program 25 is set, and once the I/O status flag is set, the local file 23 is accessed in place of the terminal 16 in response to an I/O request message issued by a program running in TSS mode to the terminal 16. On the other hand, if the I/O status flag is not set, even with the file name being set, the host machine 1 can make access to the terminal 16 as usual.

The operation will be described in further detail. First, an application program 26 operating under operating system (OS) 17 of the local machine 5 controls the measuring instruments 22, so that measurement data is collected through the bus 21 and stored in the local file 23. Subsequently, the analysis program 9 is run under control of the TSS control program 10 in the host machine 1 so that the measurement data stored in the local file 23 is analyzed in a higher degree. The TSS function of the host machine 1 is designed to operate using the terminal unit 16 of the local machine 5.

The high-grade analysis for the measurement data stored in the local file 23 may be carried out by application programs 26 of the local machine 5, however, the processing ability of the local machine 5 is generally too low as compared with that of the host machines 1 and 2 to carry out a high-grade analysis and complex process within a limited time, and therefore, the host machine 1 is used.

The following describes the principle of data transfer between the host machine 1 and the local machine 5. When the analysis program 9 transmits or receives a message to/from the terminal 7 or 8, or terminal 14, 15 or 16, control information is added to or deleted from the data element (DE) of the message by the control unit 6 using the VTAM program 11, NCP program 13, and HICOP program 18.

Figure 2:
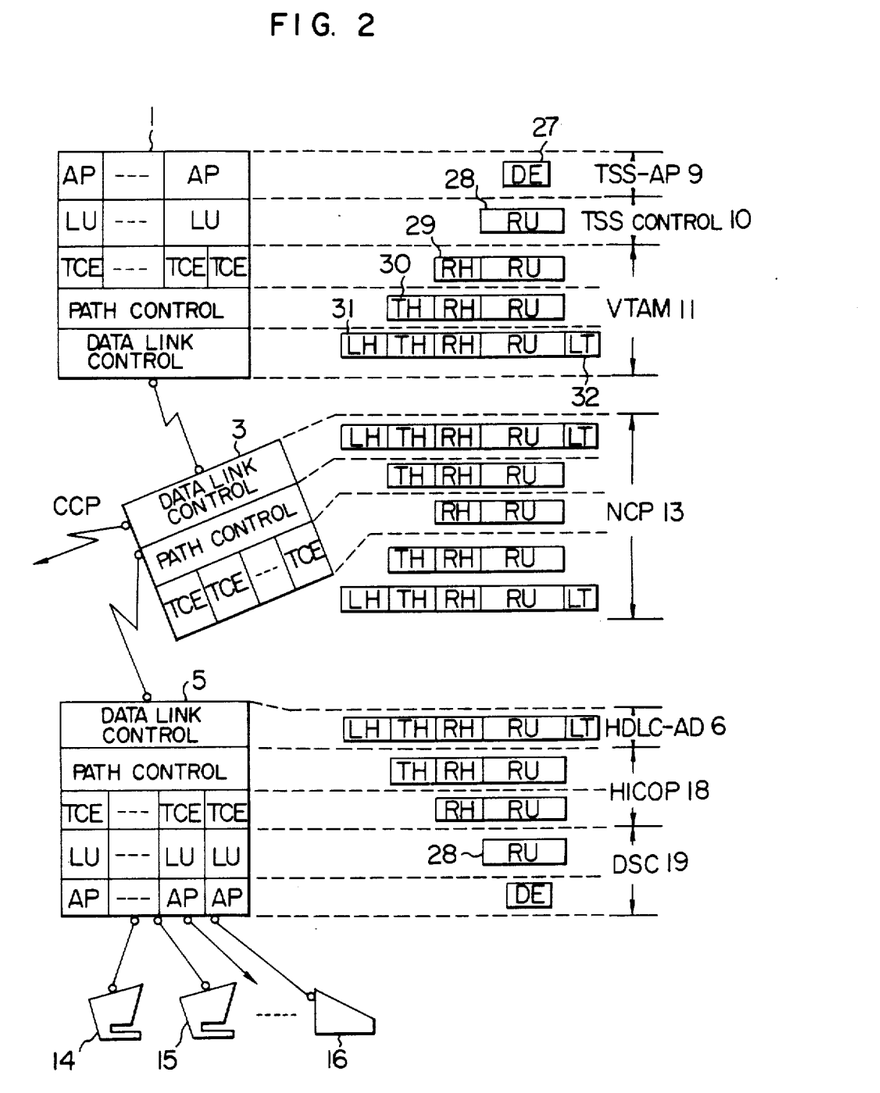
FIG. 2 is a chart showing the flow of a message within the network of FIG. 1.

FIG. 2 shows the process of adding and deleting control information by each of the host machine 1, communication control computer 3 and local machine 5. The application program (TSS-AP) 9 of the host machine 1 processes data (DE) 27 which is the minimum unit of information exchange handled by the end user, and subsequently, when the TSS terminal is of, for example, a display type, such as a video display terminal, the logical unit (LU) appends screen control information depending on the terminal to the DE 27 to form a Request Unit (RU) 28. Subsequently, Transmission Control Element (TCE) appends a Request/Response Header (RH) 29 of the VTAM 11, the next path control appends a Transmission Header (TH) such as the transmitter address indicating the transmission path (address of host machine 1 in the embodiment of FIG. 2) and receiver address (e.g., logical address of local machine), and the next data link control appends control information of the (Link Header (LH) and Link Trailer (LT) 31 and 32 related to the unit (frame) of message transfer and sends the resultant data to the communication control computer 3. In the communication control computer 3, path control eliminates the LH 31 and LT 32, and the TCE eliminates the TH 30, and thereafter, they are appended again for the transmission to the local machine 5.

In the local machine 5, the HICOP 18 having a function equivalent to the VTAM extracts the RU 20, and issues a transmission request SEND to the DSC program 19. After the RU has been sent to the DSC program 19, the DSC program 19 issues an output request WRITE 28 to the OS 17 so that the RU 28 is sent out to the terminal 16.

In this order, a message from the application program (TSS-AP) 9 of the host machine 1 is outputted to the terminal 16 of the local machine 5. Conversely, a message from the terminal 16 is entered to the application program 9 by reversing the above process.

Figure 3:
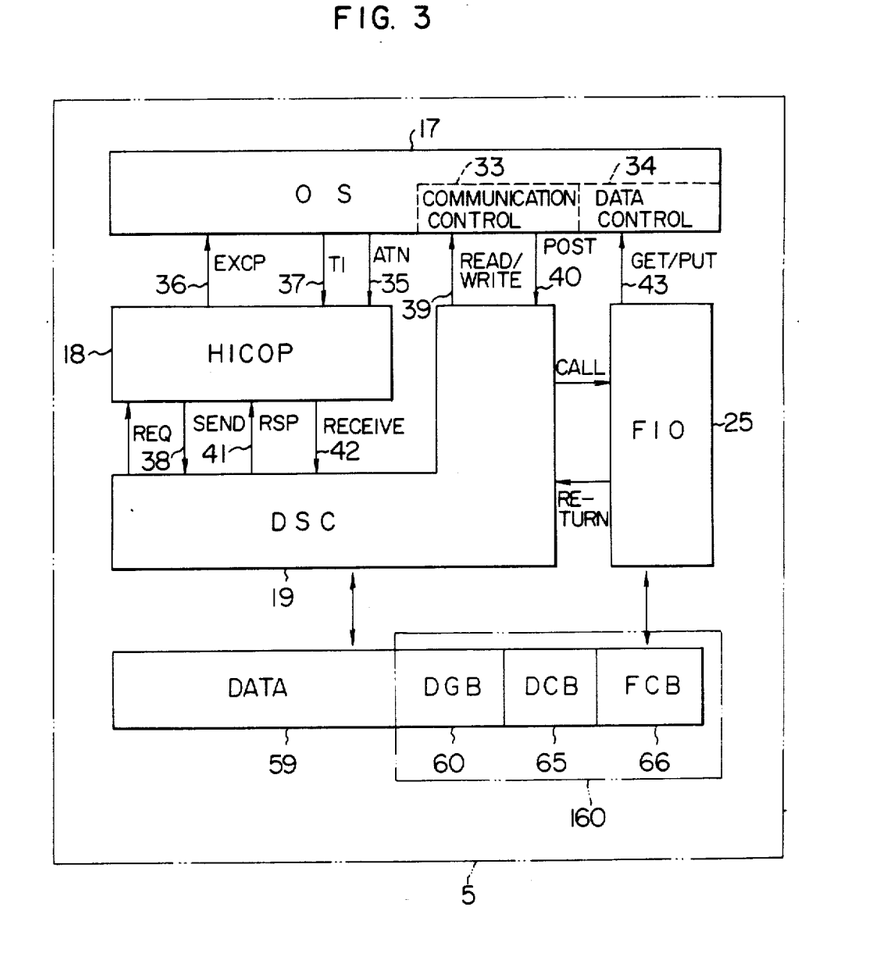
FIG. 3 is a diagram showing the relationship of control programs in the memory of the local machine shown in FIG. 1.

FIG. 3 shows the relationship between control programs stored in the memory of the local machine 5. The main memory of the local machine 5 stores data 59 and various control tables 160 in addition to programs OS 17, HICOP 18, DSC 19, and FIO 25. The control table 160 includes Device Group Block (DGB) 60, Data Control Block (DCB) 65 and File Control Block (FCB) 66.

According to the present invention, the DSC program 19 identifies the command for specifying the terminal operation replacement control entered by the terminal user, and sets the I/O status flag which is added by the present invention in the DGB 60 corresponding to that terminal within the control table, and writes the file name into the file characteristic information area in the FCB 66, and then the file input/output mode for the terminal operation replacement operation is specified. The terminal operation replacement control program (FIO) 25 which is added by the present invention tests the I/O status flag before the DSC program 19 in the local machine 5 transacts a message with the terminal 16, and operates when the flag is set. In more detail, when the flag test results in "1", control is transferred from the DSC program 19 to the FIO program 25 by the CALL statement, and control is returned to the DSC program 19 by the RETURN statement in the FIO program 25. The CALL and RETURN statements perform a branching operation in the above programs. In FIG. 3, the direction of communication between control programs is shown by the arrows.

Figure 4:
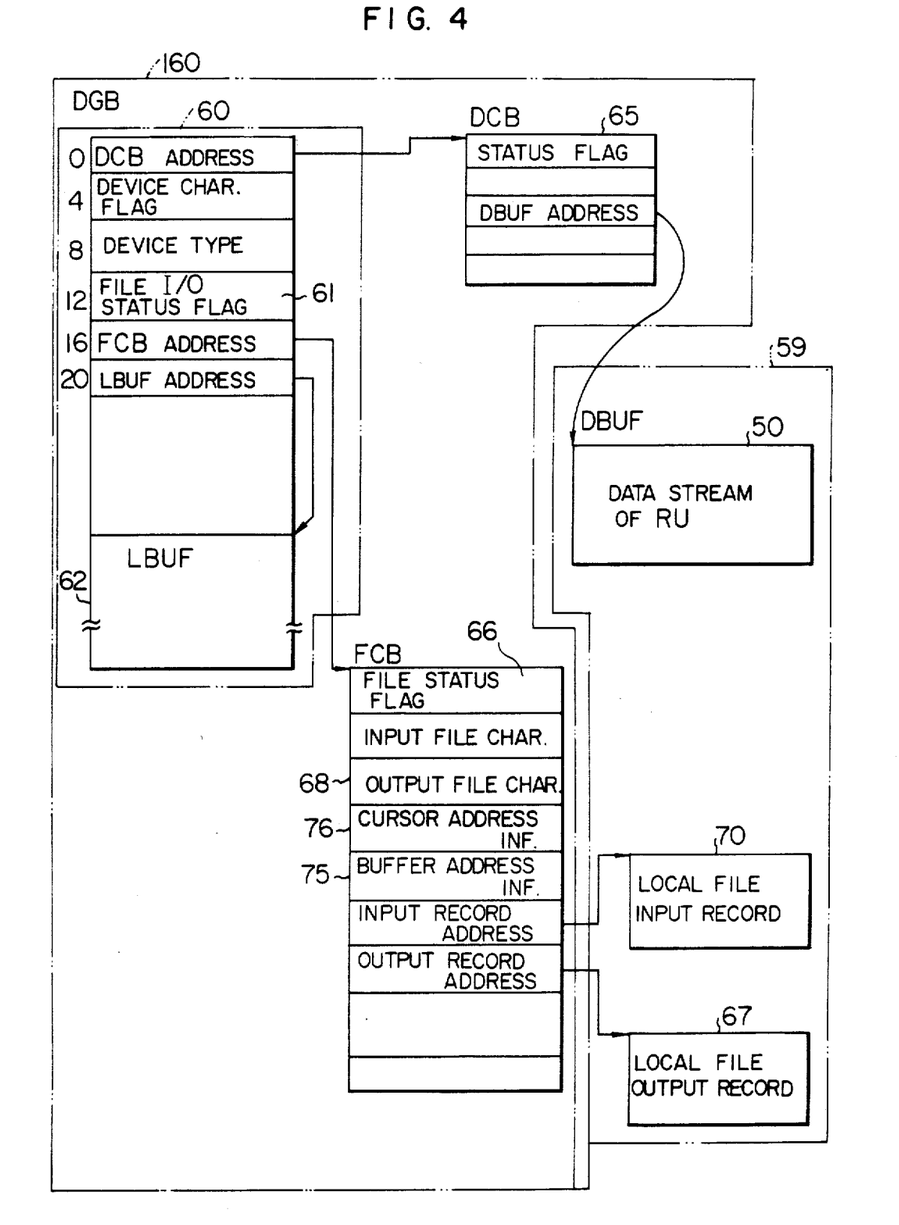
FIG. 4 is a diagram showing in detail the control table shown in FIG. 3.

FIG. 4 shows in detail the data area 59 and control table 160 shown in FIG. 3. The following describes the case where the I/O unit, i.e., data terminal 16, connected to the local machine 5 is a video data terminal. The invention is readily applicable to other types of terminals by changing the code of control characters in the data stream.

(A) First, the operational mode switching control allowing the host machine 1 to directly access the local file 23 will be described. The terminal operation replacement control function of the local machine 5 specifies its operational mode by the entry of a predetermined command from the terminal user. The operational mode includes the file output mode in which data is transferred from the host machine 1 to the local file 23, and the file input mode in which data is transferred from the local file 23 to the host machine 1. In the embodiment of the present invention, these operational modes can be set or reset independently.

The operation in file output mode is initiated by entering the following command from the terminal user of the local machine.

¥*FO [file name]   (1)

where the file name is optional and, if it is not specified, the default file name provided by the FIO program 25 is used.

On recognizing the above command (1), the DSC program 19 sets the file output mode bit of the file I/O status flag 61 in the DGB 60 corresponding to the terminal within the control table 160, and stores the output file name in the output file characteristic information area 68 in the FCB 66. In consequence, when the application program 9 of the host machine 1 carries out the output operation on the terminal 16 connected to the local machine 5, e.g., in the case of the host machine 1 to output the result of analysis, it can be replaced with the write operation to the local file 23, i.e., the operation in file output mode for the local machine 5.

The file output mode is cancelled when the local machine receives the message "READY" or the specified prompt mark indicating the end of the application program from the host machine 1, or when the interrupt key is pressed by the terminal user. In this case, the file output mode bit of the file I/O status flag 61 in the DGB 60 is reset.

The operation of the file input mode, in which the host machine 1 reads measurement data from the local file 23, is initiated by entering the following command by the terminal user of the local machine 5.

Υ*FI [file name]   (2)

On recognizing the above command (2), the DSC program 19 sets the file input mode bit of the file I/O status flag 61 in the DGB 60 corresponding to the terminal, then stores the input file name in the input file characteristic information area in the FCB 66. The file input mode is cancelled when the message "READY" or specified prompt mark indicating the end of the application program 9 is sent from the host machine 1, or when the interrupt key is pressed by the terminal user. In this case, the file input mode bit of the flag is reset.

(B) Next, the principle of data transfer between the host machine 1 and the local machine 5 will be described. The message receiving operation in the local machine 5 is initiated when the application program (TSS-AP) 9 of the host machine 1 issues a macro request (PUTLINE macro) to the TSS control program 10 so as to outputting a message to the terminal 16. In this case, frames of message (RU 28, RH 29, TH 30, LH 31, and LT 32) shown in FIG. 2 are sent via the communication control computer 3 to the local machine 5. The application program (TSS-AP) 9 of the host machine 1 is of course designed to communicate with the data terminal 16 of the local machine 5, and the specification of the terminal 16 as a message destination address is contained in the Transmission Header (TH) 30 so as to make access to the terminal 16. Then, the local machine 5, in reference to the address, makes direct access to the terminal 16 or access to a file storage corresponding to the terminal depending on the status of the file output mode bit.

The HICOP 18 in the local machine 5 extracts the RU 28 and stores it in a data buffer (DBUF) 50 within the data area 59 shown in FIG. 4. The process for storing the RU 26 in the data buffer 50 is carried out between the OS 17 and HICOP 18 shown in FIG. 3. Namely, the OS 17 reports data reception (ATN) 35 to the HICOP 18, and the HICOP 18 issues a data reception request (EXCP) 36 to the OS 17.

After storing the data stream of the request unit (RU) 28 shown in FIG. 4 in the data buffer 50, the OS 17 sends a termination report (TI) 37 to the HICOP 18 to report the end of the process.

After the data stream of RU 28 has been stored in the data buffer 50, the HICOP 18 issues a data transmission request (SEND) 38 to the DSC program 19. Namely, in order for the HICOP 18 to maintain the dominant position against the DSC program 19, the message reception at the terminal 16 is seen from the HICOP 18 to be a transmission request (SEND).

The parameter handed over from the HICOP 18 to the DSC program 19 is the address of the main memory location where the DGB 60 shown in FIGS. 3 and 4 is stored. Accordingly, the local machine 5 makes access to the address of the main memory for reading the control table DGB of FIG. 4, and thereafter access to the memory again using the DCB address stored in the top address of the table (with displacement of zero byte) thereby to read the control table DCB 65. By making access again to the memory using the DBUF address in the DCB 65, the data stream in the data buffer (DBUF) 50 can be read out. The DSC program 19 tests the request code (CMD: CMD 42 of FIG. 5) at the first byte of the data stream (RU 28) in the DBUF 50 to recognize the message output to the terminal 16, and issues the WRITE macro request to the communication control program 33 in the OS 17 so as to send out data following the first byte to the terminal 16. Then, the message from the host machine 1 is outputted to the terminal 16.

On receiving a termination report (POST) 40 for the message output to the terminal 16 from the communication control program 33, the DSC program 19 responds to the HICOP 18 with a process termination report (RSP) 41 to complete the process of message reception from the host machine 1.

Figure 5:
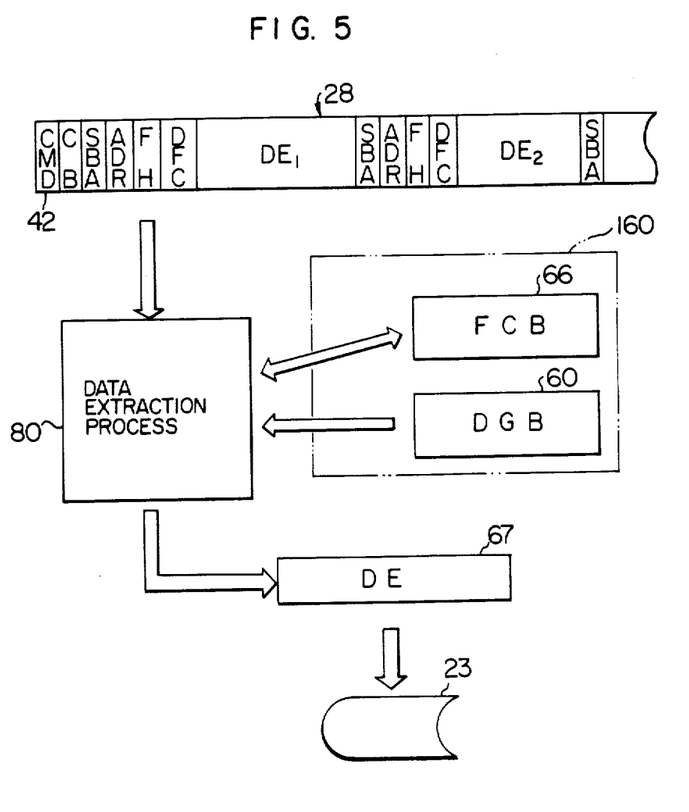
FIG. 5 is a diagram explaining the file output operation according to the invention.

FIG. 5 shows the process of writing a message sent from the host machine 1 into the local file. In the request unit (RU) 28 of the received message, a request code for indicating data transmission from the host machine 1 to the terminal 16 or data reception by the host machine 1 from the terminal 16 is set in CMD 42 which is the first byte of the data stream. Accordingly, when the host machine 1 sends a message to the terminal 16, the data transmission request code is set in the CMD 42.

The terminal operation replacement control program (FIO) 25 shown in FIG. 3 is called before the DSC program 19 issues a WRITE macro request to the communication control program 33. The FIO program 25 tests the file I/O status flag 61 in the DGB 60 shown in FIG. 4 to determine whether or not the system is in a data output mode to the local file 23. With the file output mode bit of the I/O status flag 61 being "1", data is outputted to the file 23, or with the output mode bit being "0", data is simply outputted to the terminal 16, as mentioned previously. When the data output mode is specified as in the case of outputting the result of analysis for measurement data from the host machine 1, the FIO program 25 scans the data stream in the DBUF 50 shown in FIG. 4 to eliminate screen control information attached to the RU 28 for controlling the data terminal 16, and thereafter transfers the data of data stream to the file record 67 in accordance with output file characteristic information in File Control Block (FCB) 66 so that the data is sent to the local file 23.

Screen control information attached to the data stream of the RU includes Set Buffer Address (SBA), Address (ADR), Field Heading (FH), and Define Field Character (DFC) as shown in FIG. 5. Process 80 of FIG. 5 is shown in the detailed flowchart of FIG. 7, in which the data stream is scanned sequentially and data elements ($DE_1$ and $DE_2$) to be transferred to the file record 67 are extracted while eliminating screen control characters for the video terminal.

Figure 6:
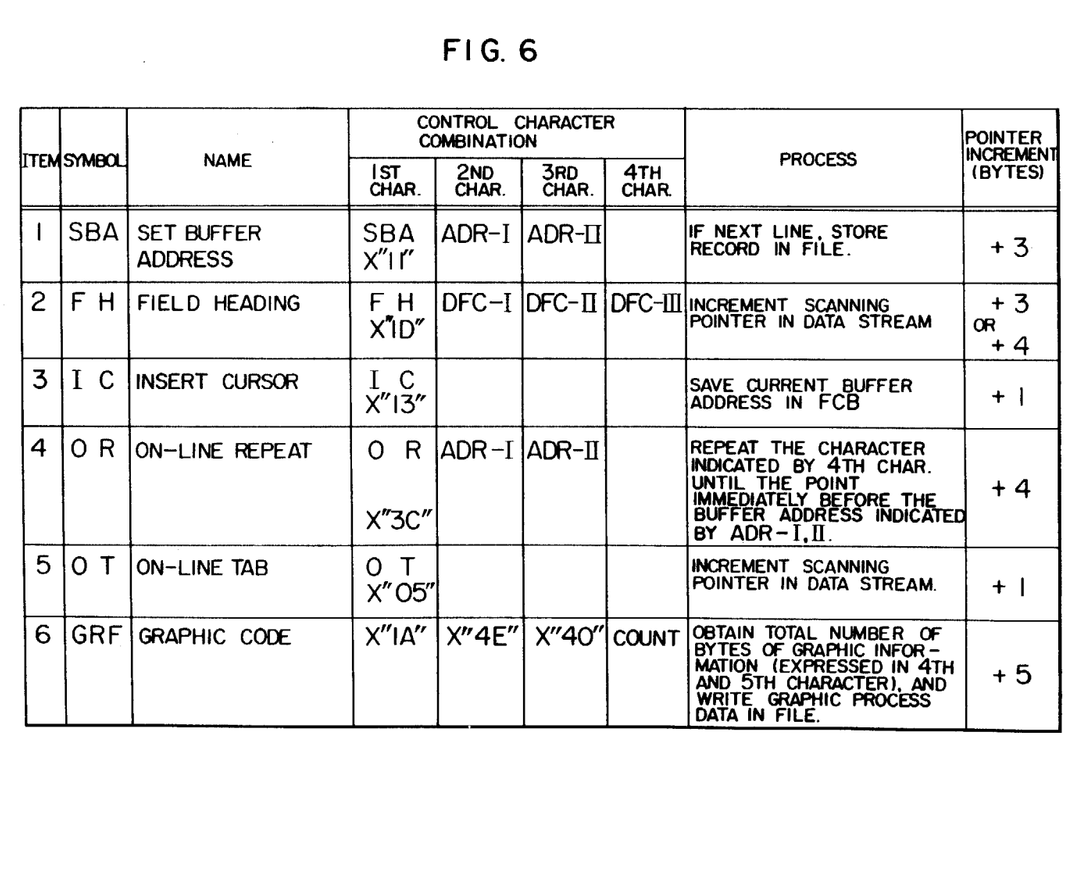
FIG. 6 is table explaining screen control information in the message data stream.

FIG. 6 shows screen control information in the data stream and the process for it. SBA specifies the address of the screen buffer. Data stream is scanned by the scanning pointer, and when SBA is detected, the scanning pointer is incremented by 3 bytes, since the 2 bytes following SBA are unnecessary as data to be outputted to the file. Similarly, when FH is detected, the scanning pointer is incremented by 3 or 4 bytes. When Insert Cursor (IC) is detected, the buffer address is saved in the FCB, and the pointer is incremented by 1 byte. When OR is detected, the process is repeated up to the location immediately preceding ADR-I and ADR-II. The scanning pointer is also advanced when OT is detected. When GRF is detected, graphic data is written in the file.

Figure 7:
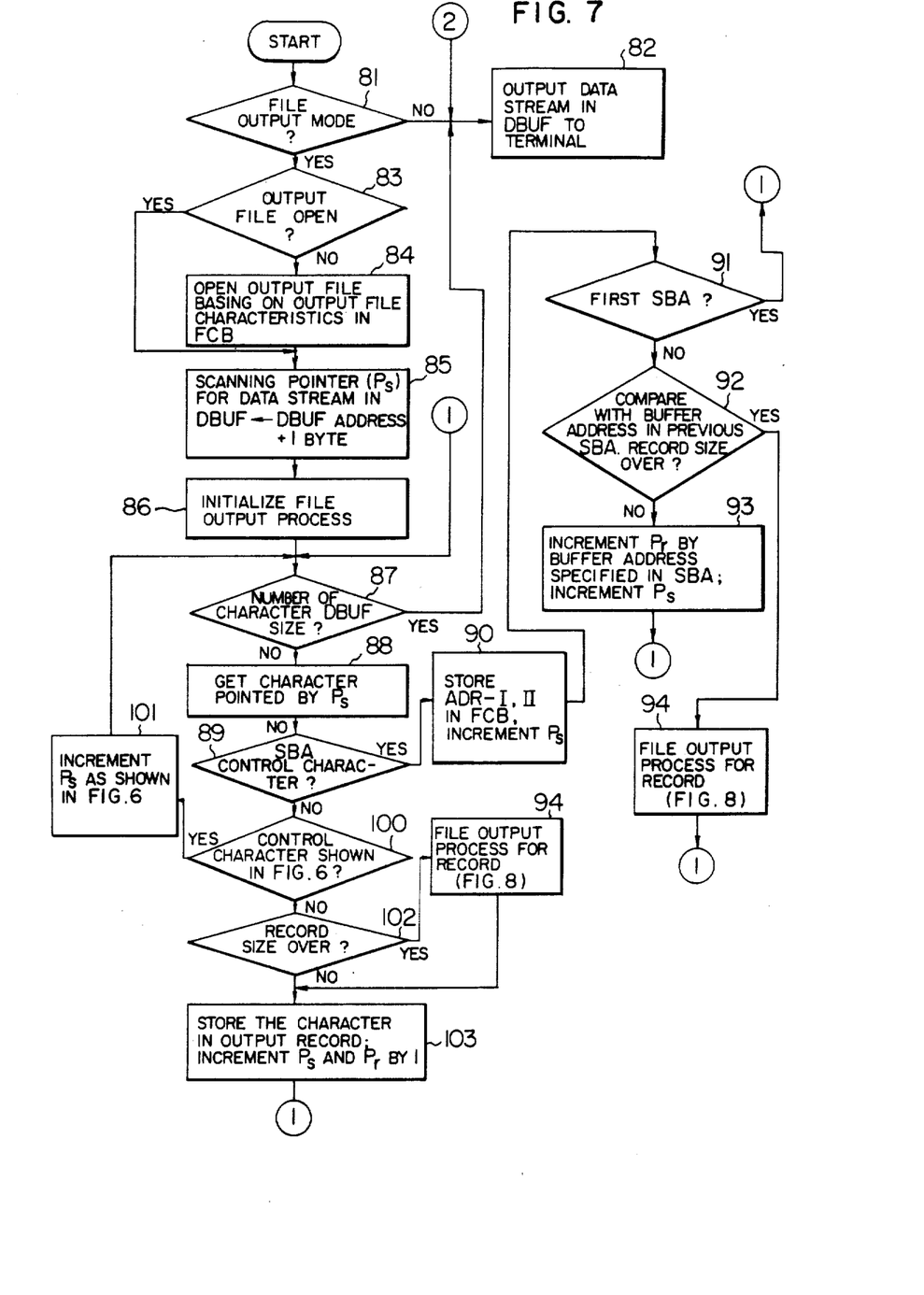
FIGS. 7 and 8 are flowcharts showing the file output process according to the invention.
Figure 8:
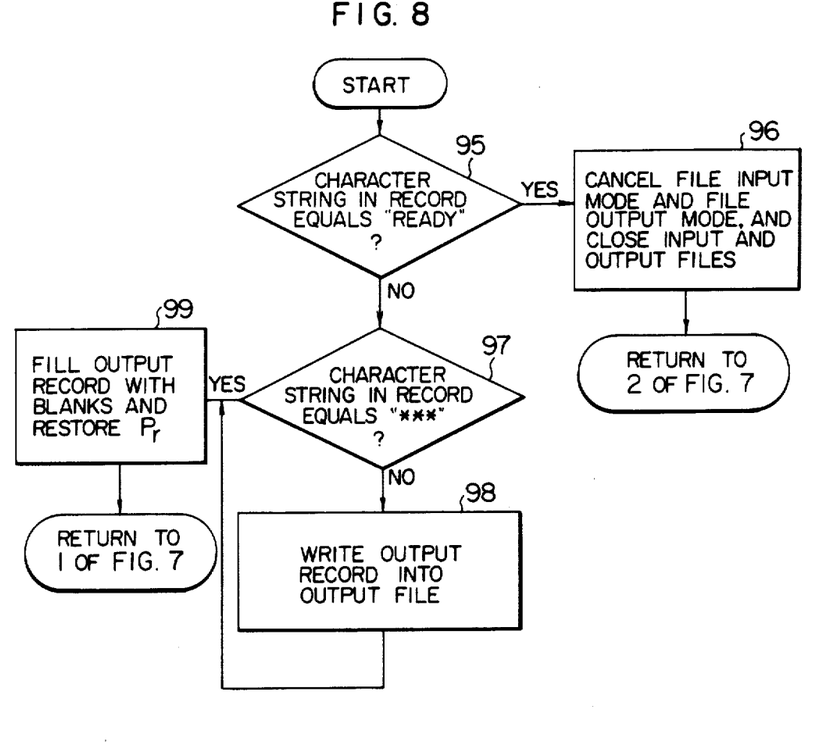

FIGS. 7 and 8 are the process flowcharts for the local machine, and they correspond to process 80 in FIG. 5.

First, in decision step 81, the FIO program 25 tests the I/O status flag 61 in the DGB 60, and if it is "0" indicating that the file output mode, i.e., terminal operation replacement mode, is not specified, the DSC program 19 carries out process 82 so that the data stream in the DBUF 50 is directly sent to the terminal 16. If, on the other hand, the file output mode bit is "1", the FIO program 25 tests the file status flag 69 in the FCB 66 at decision step 83, and if the file is already opened, i.e., ready to be accessed, the scanning pointer is set to $P_s$ by determination of the starting point for scanning the data stream in process 85. If the output file is not yet open, i.e., the file is not ready to store the contents of the output record 67, preparation is made in process 84 for accessing the output file in accordance with output file characteristic information 68 in the FCB 66. The output file characteristic information includes the file name, file type and record size. In process 86, the output record 67 in FIG. 5 is filled with space characters before entering characters of the data stream, and the storing pointer $P_r$ is set to the top of the output record 67. Decision step 87 tests if the DBUF 50 is full. The size of DBUF 50 is stored in the DCB 65. In process 88, one character is taken out of the DBUF 50, and it is tested for special control character SBA (Set Buffer Address) in decision step 89. If the character is identified to be an SBA control character, processes 90–94 are carried out. In these processes, two characters following the SBA control character indicate the screen buffer address of the video data terminal as shown in FIG. 6, and in process 90, the buffer address is saved in the FCB 66 when the control character is created at data transmission which will be described later. Decision step 92 tests the record size, and if the size of output record 67 is not exceeded, the operation proceeds to process 93. If the buffer address following the SBA control character exceeds the size of the output record 67, the contents of the output record 67 are written to the file 23 (process 94).

The flowchart of FIG. 8 shows the process of writing the contents of output record 67 into the local file 23. Decision step 95 tests whether the character string at the top of the output record 67 is message "READY". The message "READY" is assumed to be a signal indicated to the terminal 16 that the TSS control program 10 (see FIG. 1) of the host machine 1 has been completed, and the process 96 immediately cancels file output mode and file input mode, instead of writing the message to the local file 23. Namely, by the above message "READY", the FIO 25 recognizes the end of the application program 9 under the TSS control program. Decision step 97 tests whether the character string is "*". The message "*" is assumed to be issued by the TSS control program 10 as of the message "READY", and it is not written into the local file 23. The message "***" is a special message for the video terminal, indicated by the TSS control program 10 to the user of terminal unit 16 that the screen of the terminal 16 is filled with characters. Accordingly, when this message is detected, the process 98 transfers the contents of output record 67 to the local file 23 without waiting for the entry of a command by the user, and the output record 67 is initialized by process 99.

Referring back to FIG. 7, decision step 100 tests whether a character in the data stream coincides with the control character shown in FIG. 6, and if this is true, the pointer $P_s$ for the scanning data stream is incremented by the amount shown at the right end of FIG. 6 so that characters unnecessary as data are skipped. If, on the other hand, data stream characters are not the control character, decision step 102 tests if the size of output record 67 is exceeded, and then process 103 stores each character of effective data element (DE) in the data stream of RU 28 shown in FIG. 5 into the output record 67. By repetition of the above processes 87 through 103, only output data in the DBUF 50 from the host machine 1 is transferred to the local file 23. On completion of the processes for the DBUF 50, the data stream in the DBUF 50 is directly displayed on the video data terminal 16 by process 82.

By the operation described above, the message sent from the host machine 1 to the terminal 16, i.e., transmission data indicating the result of analysis for measurement data processed by the application program 9 can be stored in the local file 23. This fact signifies that the application program 9 running in the host machine 1 can make direct access to the local file 23. The FIO control program 25 of the local machine 5 operates to store the output message from the host machine 1 in the local file 23, and thus the application program 9 of the host machine 1 need not be aware of the storing operation. Namely, it is an advantage of this control system that the host machine 1 can access the file storage 23 without any alteration of the application program handling data terminals.

(C) Next, the operation of the host machine 1 for receiving a message (data) from the local machine 5 will be described. Transmission of a message (data) from the local machine 5 to the host machine 1 is initiated when a macro request (GETLINE macro) is issued to the TSS control program 10 so that an application program (e.g., TSS-AP) 9 in the host machine 1 receives a message from the terminal 16 or the like. Also in this case, as in the case of message transmission by the host machine 1 described above, frames of the message shown in FIG. 2 are sent to the local machine 5, and the HICOP program in the local machine 5 extracts the RU 26 and stores it in the data buffer (DBUF) 50 shown in FIG. 4. The procedures of the OS 17 and HICOP 18 for storing the RU 28 in the DBUF 50 are the same as for message transmission by the host machine 1.

In FIG. 3, the HICOP 18 in the local machine 5 next issues a data transmission request (SEND) 38 to the DSC program 19. The DSC program 19 tests the first byte of the data stream, i.e., CMD 42, in the RU 28. The CMD 42 indicates the type of terminal operation, and it is recognized that the request is a message input from the terminal 16 to the host machine 1. On recognizing the message input request to the terminal 16, the DSC program 19 issues a macro request (READ) to the communication control program 33 by using a line buffer (LBUF) 62 shown in FIG. 4. The communication control program 33 stores data which has been keyed-in on the terminal 16 by the terminal user in the line buffer (LBUF) 62, and sends an input completion report (POST) 40 to the DSC program 19.

Subsequently, the DSC program 19 returns a process completion report (RSP) 41 for the data transmission request (SEND) which has been requested by the HICOP 18, then the HICOP 18 issues a data reception request (RECEIVE) 42 again to the DSC program 19. The DSC program 19 moves the message, which has been entered by the terminal and stored in the line buffer (LBUF) 62, to the data buffer (DBUF) 50 to complete the process of RECEIVE 42, and returns a completion report (RSP) 41 to the HICOP 18. Although, in the conventional system, the message transmission is completed when the HICOP 18 transfers the message in DBUF 50 to the host machine 1, according to the present invention, the FIO program 25 is called before the DSC program 19 issues a macro request (READ) 39 to the communication control program 33.

The FIO program 25 tests the file I/O status flag 61 in the DGB 60 shown in FIG. 4 to know whether or not the data input mode is set. Unless the data input mode has been set by the DSC program 19, data input from the local file 23 does not take place. On the other hand, if the data input mode is set, the FIO program 25 processes and stores data, which has been read from the local file 23 to the input record 70, in the line buffer (LBUF) 62 shown in FIG. 4 as if the data were to be read as a key input on the video data terminal. This processing is called an "encoding process". In case the FIO program 25 has read data from the file 23, the DSC program 19 does not issue a macro request (READ) 39 to the communication control program 33 for requiring the terminal 16 to enter a message.

Figure 9:
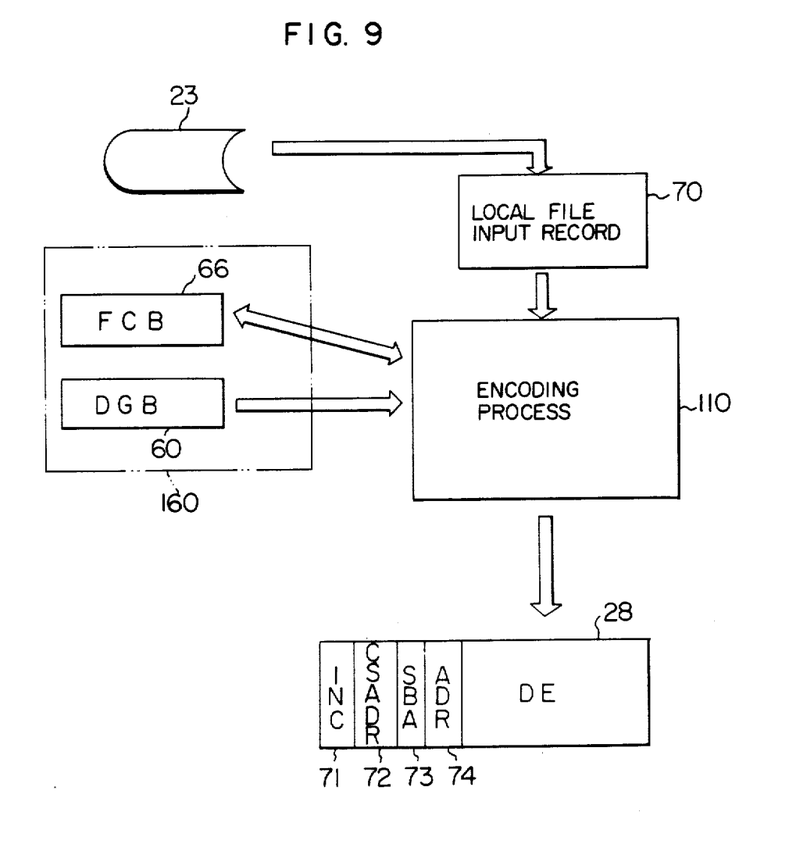
FIG. 9 is a diagram explaining the file input operation according to the invention.

FIG. 9 shows the process of a record which is read by the terminal operation replacement program 25 from the local file 23. In the figure, reference numeral 70 denotes a local file input record for entering record (DE) from the local file 23, 60 and 66 denote control tables DGB and FCB, respectively, and 28 denotes the data stream (RU).

The input data record 70 read from the local file 23 is formed by Encode process 110 so that INC 71, CSADR 72, SBA 73 and ADR 74 necessary to form a data stream from a data terminal are appended, i.e., the format is converted, then stored as the data stream of RU 28 in the line buffer (LBUF) 62 in the DGB 60. Namely, the FIO program 25 issues a macro request (GET) 43 to the data control program 34 so as to read data from the local file 23 for carrying out the replacement process, instead of the DSC program 19 conventionally reading data which has been keyed-in on the terminal 16 through the communication control program 33 as shown in FIG. 3.

Figure 10:
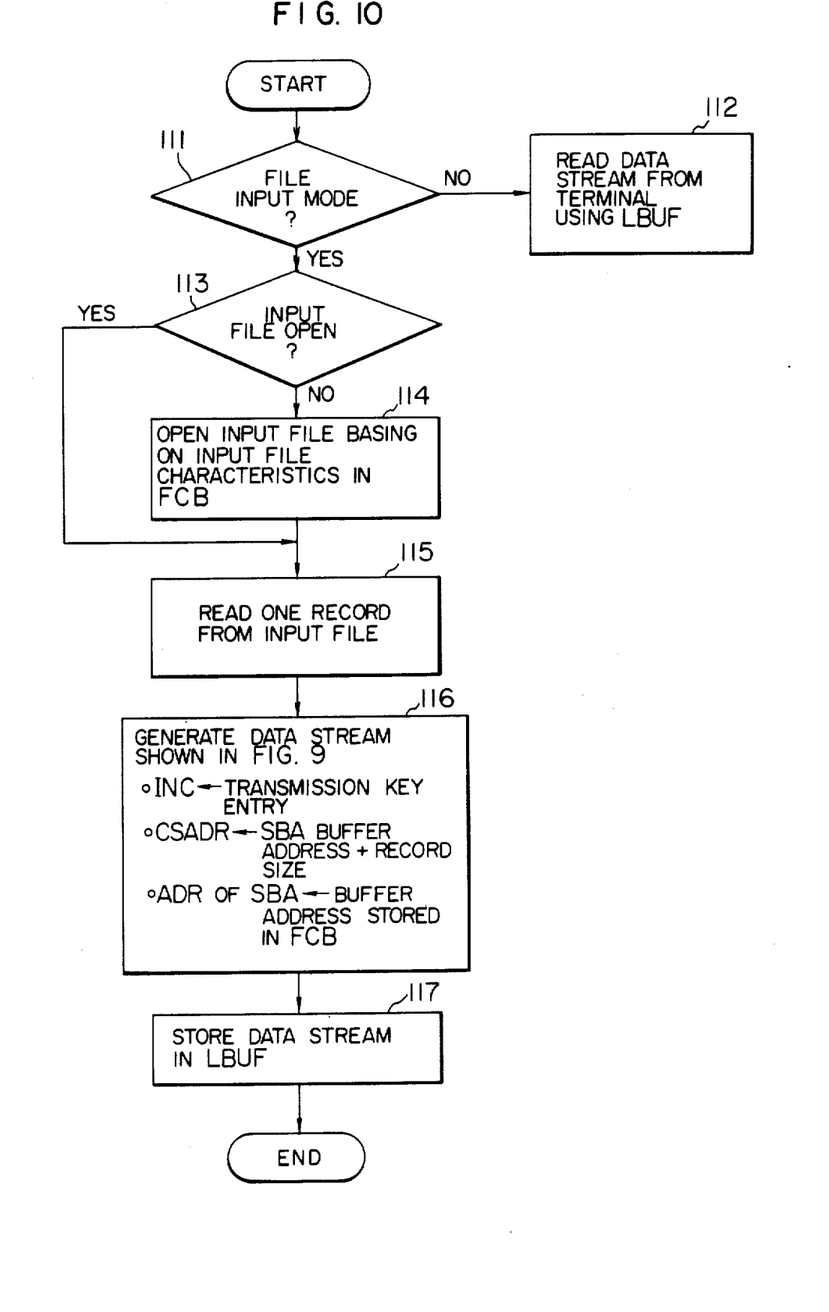
FIG. 10 is a flowchart showing the file input process according to the invention.

FIG. 10 is a flowchart showing the operation of entering data from the local file 23, and this process corresponds to the encoding process 110 by the FIO program 25 in FIG. 9.

The FIO program 25 tests at decision step 111 the file I/O status flag 61 in the DGB 60 shown in FIG. 4. Unless file input mode is set, i.e., if the bit is reset, the operation proceeds to process 112, and control is transferred to the DSC program 19 so that data on the terminal 16 is read into the LBUF 62. If, on the other hand, the file input mode is set, the operation proceeds to processes 113 and 114. The processes 113 and 114 are identical to the processes 83 and 84 in the foregoing file output process, but, different from the previous case, using the file status flag 69 and input file characteristic information 63 in the FCB 66. After preparation for entering data from the file 23 has been completed in process 114, one record is read into the input record 70 in process 115. In process 116, control characters specific to each data terminal, such as INC 71, CSADR 72, SBA 73 and ADR 74, are added so as to provide the same format as of data stream transmitted from the data terminal 16. The INC (Interrupt Code) 71 is a special code for indicating the terminal operator's action to the TSS control program 10 in the host machine 1. The CSADR (Cursor Address) 72 has a 2-byte length, indicating the cursor position on the screen at which the last data has been entered. The FIO program 25 adds the input record size to the address, which has been stored in buffer address information 75 in the FCB 66 during the foregoing file output process, to form the CSADR. This value is saved in cursor address information 76 in the FCB 66. The SBA (Set Buffer Address Code) 73 signifies that two bytes following this character code indicates the starting buffer address of screen data for the video data terminal. The ADR (Buffer Address) 74 has the 2-byte length, indicating the starting buffer address of screen data for the video data terminal. Accordingly, the FIO program 25 uses the value which has been saved in buffer address information 75 in the FCB 66 during the file output process.

In this way, the contents of the file 23 in the local machine 5 are transferred to the application program 9 in the host machine 1. This allows the application program 9 running in the host machine 1 to make direct access to the local file 23, making it possible for the analysis program 9 running in the host machine 1 to process data collected by the local machine 5 without the need for transferring the data to the file 24 of the host machine 1, as in the case of the foregoing message receiving operation.

Figure 11:
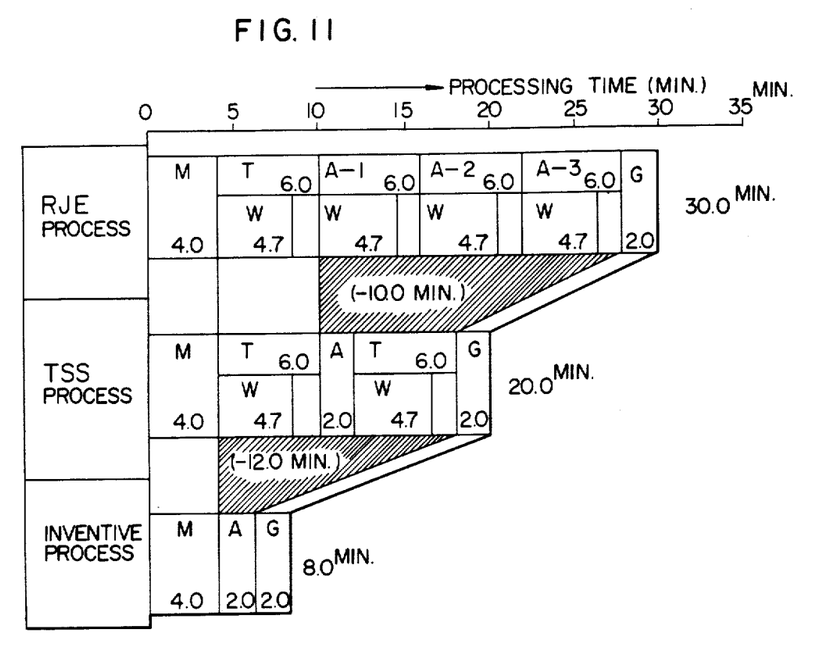
FIG. 11 is a chart comparing the processing time according to the present invention with that of the conventional system.

FIG. 11 compares the process and transfer time according to the present invention with that of the conventional systems.

In the conventional system, when data measured and collected by the local machine 5 is analyzed by the host machine 1, the data file is transferred in the RJE system or the like to the host machine 1 and, after the analysis by the host machine 1, the resultant data file is transferred back to the local machine 5, and thus it takes a considerable time for the process of data transfer. FIG. 11 compares the total time of a series of processes from measurement, data transfer, analysis, and graphic display for the result of analysis among RJE system, a system using only TSS, and the inventive terminal operation replacement control system which uses both the TSS and the local file input/output operation. The measurement time M is 4.0 minutes in the all systems. In RJE system, it takes a long wait time (4.7 minutes) for each of analyses A-1, A-2 and A-3 due to batch processing, resulting in a total analysis time of 18 (6.0×3) minutes, but takes a shorter transfer time of 6.0 minutes because the data file and the analysis result can be transferred concurrently. In the TSS system, the analyses A-1, A-2 and A-3 can be carried out in a short time of 2.0 minutes due to online processing, but separate transfers for the data file and the analysis result take 12.0 minutes including a lengthy wait time W (4.7 minutes) during the transfer process.

According to the inventive system, on the other hand, online analysis by TSS takes only 2 minutes, and the total time including the measurement and graphic display time is 8.0 minutes. Namely, the time for the linkage process by the host machine and local machine is reduced significantly, and the wait time during the transfer of the data file is eliminated, resulting in a very short processing time.

According to the present invention, as described above, when the application program running in the host machine issues an I/O request for data stream to the terminal connected to a local machine, it can be substituted by the input/output operation for the file connected to the local machine, and this allows elimination of file transfer process between the local file and host file, whereby the process efficiency can be improved. In this case, the application program of the host machine is not aware of the substitutive control by the local machine, and thus system functions which have been set up in the past are not restricted at all by the inventive system.

Although, in the above embodiment, the I/O request issued from the host machine 1 to the data terminal 16 is replaced with the I/O request to the local file, i.e., the file storage 23, it may be replaced with the I/O request to another I/O unit of the local machine 5. It is also possible to arrange a direct communication between the host machine 1 and the measuring instruments 21 by forming the data stream transferred on the standard interface bus 21 for the instruments of the local machine 5 shown in FIG. 1 to have the same format as the data stream of the I/O unit requested by the host machine 1.

What is claimed is:

1. A data processing system using a plurality of input/out devices comprising:
    a first computer; and
    a second computer connected through a network to said first computer and connected to a plurality of input/output devices including at least one operator-controlled input/output device, said first computer having means for requesting one of said input/output devices for data transfer and said second computer including:
    (1) operator-controlled designation means for designating an input/output device, of said input/output devices which is different from the input/output requested by said first computer, as an input/output device to perform said data transfer with said first computer; and
    (2) control means connected to said first computer, said requested input/output device and said designated input/output device, and having output processing means for receiving from said first computer an output data stream including output data and having a format for said requested input/out device in response to an output request issued by said first computer, for reformatting the received output data stream to produce reformatted data for said designated input/output device, and for outputting said reformatted output data to said designated input/output said reformatted output data to said designated input/output device, and thereafter, for inputting said reformatted output data from said designated input/output device in response to a signal from said requested input/output device, for reformatting said reformatted output data to produce an output data stream having a format for said requested input/output device and for outputting the produced data stream to said requested input/output device; and input processing means for inputting from said requested input/output device an input data stream including input data and having a format for said first computer in response to a signal from said requested input/output device, for reformatting the received input data stream to produce reformatted data for said designated input/output device, and for outputting said reformatted data to said designated input/output device, and thereafter, for inputting said reformatted input data from said designated input/output device in response to an input request issued by said first computer, for reformatting said reformatted data to produce an input data stream having a format for said first computer, and for outputting the produced data stream to said first computer.

2. A data processing system according to claim 1, wherein the input/out device requested by said first computer is an operator-controlled data terminal device, and the input/output device designated by said operator-controlled designation means is a file storage device.

3. A data processing system according to claim 2, wherein said operator-controlled designation means comprises flag means for indicating the designation of said file storage device and file indication means for indicating a file name to be accessed in said file storage device, said control means including means for accessing said flag means and said file indication means in advance of operation of said input processing means and said output processing means.

4. A data processing system according to claim 3, wherein said operator-controlled input/output device is a data terminal device, and said file indication means of said operator-controlled designation means is controlled in response to a command entered on said data terminal device to indicate a selected file name.

5. A data processing system according to claim 2, wherein said operator-controlled designation means designates a file storage device to each of said output processing means and said input processing means independently.

6. A data processing system according to claim 5, wherein said operator-controlled designation means comprises:
first flag means for indicating the designation of a file storage device to be accessed by said output processing means;
first means for indicating a file name to be accessed by said output processing means in the file storage device indicated by said first flag means;
second flag means for indicating the designation of a file storage device to be accessed by said input processing means; and
second means for indicating a file name to be accessed by said input processing means in the file storage device indicated by said second flag means.

7. A data processing system according to claim 6, wherein said operator-controlled input/output device is a data terminal device, and said first and second indication means of said operator-controlled designation means are controlled in response to a command entered on said data terminal device to indicate a selected file name.

8. A data processing system according to claim 2, wherein said data terminal device has a data display device for producing a data display and the data stream sent from said first computer further includes an output address related to a display starting position for data display of said output data on the data display device of the data terminal device requested by said first computer, said control means including means for storing said output address included in the data stream which has been most recently sent from said first computer.

9. A data processing system according to claim 8, wherein said input processing means comprises means for appending address information related to said output address and input data length stored in said control means to said input data stream.

10. A data processing system according to claim 6, wherein said data terminal device has a data display device for producing a data display and the data stream sent from said first computer further includes an output address related to a display position for data display of said output data on the data display device of the data terminal device requested by said first computer, said control means including means for storing said output address included in the data stream which has been most recently sent from said first computer.

11. A data processing system according to claim 10, wherein said input processing means comprises means for appending address information related to said output address stored in said control means and input data length to said input data stream.

12. A data processing system according to claim 3, wherein said flag means of said operator-controlled designation means is reset by a predetermined message issued by said first computer.

13. A data processing system according to claim 3, wherein said flag means of said operator-controlled designation means is reset by an interrupt request issued by said operator-controlled data terminal device.

14. A data processing system using a plurality of input/output devices comprising:
a first computer; and
a second computer connected through a network to said first computer and connected to a plurality of input/output devices including at least one operator-controlled input/output device, said first computer having means for requesting one of said input/output devices for data transfer and said second computer including:
(1) operator-controlled designation means for designating an input/output device, of said input/output devices which is different from the input/output device requested by said first computer, as an input/output device to perform said data tranfer with said first computer; and (2) control means connected to said first computer, said requested input/output device and said designated input/output device, and having output processing means for receiving from said first computer an output data stream including output data and having a format for said requested input/output device in response to an output request issued by said first computer, and for outputting said data stream to said designated input/out device, and thereafter, for inputting said data stream from said designated input/out device in response to a signal from said requested input/output device, and for outputting said data stream to said requested input/output device, and input processing means for inputting from said requested input/output device an input data stream including input data and having a format for said first computer in response to a signal from said requested input/output device, and for outputting said input data stream to said designated input/output device, and thereafter, for inputting said input data stream from said designated input/output device in response to an input request issued by said first computer, and for outputting said input data stream to said first computer.

15. A data processing system acording to claim 14, wherein the input/output device requested by said first computer is an operator-controlled data terminal device, and the input/output device designated by said operator-controlled designation means is a file storage device.

16. A data processing system according to claim 15, wherein said operator-controlled designation means comprises flag means for indicating the designation of said file storage device and file indication means for indicating a file name to be accessed in said file storage device, said control means including means for accessing said flag means and said file indication means in advance of operation of said input processing means and said output processing means.

17. A data processing system according to claim 16, wherein said operator-controlled input/output device is a data terminal device, and said file indication means of said operator-controlled designation means is controlled in response to a command entered on said terminal device to indicate a selected file name.

18. A data processing system according to claim 15, wherein said operator-controlled designation means designates a file storage device to each of said output processing means and said input processing means independently.

19. A data processing system according to claim 18, wherein said operation-controlled designation means comprises:

first flag means for indicating the designation of a file storage device to be accessed by said output processing means;

first means for indicating a file name to be accessed by said output processing means in the file storage device indicated by said first flag means;

second flag means for indicating the designation of a file storage device to be accessed by said input processing means; and second means for indicating a file name to be accessed by said input processing means in the file storage device indicated by said second flag means.

20. A data processing system according to claim 19, wherein said operator-controlled input/output device is a data terminal device, and said first and second indication means of said operator-controlled designation means are controlled in response to a command entered on said data terminal device to indicate a selected file name.

21. A data processing system according to claim 15, wherein said data terminal device has a data display device for producing a data display and the data stream sent from said first computer further includes an output address related to a display starting position for data display of said input data on the data display device of the data terminal device requested by said first computer, said control means including means for storing said output address included in the data stream which has been most recently sent from said first computer.

22. A data processing system according to claim 21, wherein said input processing means comprises means for appending address information related to said output address and input data length stored in said control means to said input data stream.

23. A data processing system according to claim 19, wherein said data terminal device has a data display device for producing a data display and the data stream sent from said first computer further includes an output address related to a display position for data display of said output data on the data display device of the data terminal device requested by said first computer, said control means including means for storing said output address included in the data stream which has been most recently sent from said first computer.

24. A data processing system according to claim 23, wherein said input processing means comprises means for appending address inforation related to said output address stored in said control means and input data length to said input data stream.

25. A data processing system according to claim 16, wherein said flag means of said operator-controlled designation means is reset by a predetermined message issued by said first computer.

26. A data processing system according to claim 16, wherein said flag means of said operator-controlled designation means is reset by an interrupt request issued by said operator-controlled data terminal device.

* * * * *